US009942346B2

(12) United States Patent
Slaviček et al.

(10) Patent No.: US 9,942,346 B2
(45) Date of Patent: Apr. 10, 2018

(54) CACHING MECHANISM FOR DETERMINING VALIDITY OF CACHED DATA USING WEB APPLICATION BUSINESS LOGIC

(71) Applicant: Red Hat, Inc., Raleigh, NC (US)

(72) Inventors: Pavel Slaviček, Czech Republic (CZ); Rostislav Svoboda, Czech Republic (CZ)

(73) Assignee: RED HAT, INC., Raleigh, NC (US)

( * ) Notice: Subject to any disclaimer, the term of this patent is extended or adjusted under 35 U.S.C. 154(b) by 818 days.

(21) Appl. No.: 14/045,444

(22) Filed: Oct. 3, 2013

(65) Prior Publication Data

US 2015/0100659 A1 Apr. 9, 2015

(51) Int. Cl.
*G06F 15/167* (2006.01)
*H04L 29/08* (2006.01)

(52) U.S. Cl.
CPC ...... *H04L 67/2842* (2013.01); *H04L 67/2852* (2013.01)

(58) Field of Classification Search
CPC .................. H04L 67/2852; H04L 67/2842
USPC .................................. 709/213, 217, 224
See application file for complete search history.

(56) References Cited

U.S. PATENT DOCUMENTS

| | | | |
|---|---|---|---|
| 6,460,141 B1 | 10/2002 | Olden | |
| 6,895,401 B2 | 5/2005 | Skinner et al. | |
| 6,968,535 B2 | 11/2005 | Stelting et al. | |
| 7,130,964 B2 | 10/2006 | Ims et al. | |
| 7,418,567 B2 | 8/2008 | Clisby | |
| 7,899,879 B2 | 3/2011 | Broda | |
| 2006/0206452 A1* | 9/2006 | Ebbo | G06F 17/30902 |
| 2006/0277248 A1* | 12/2006 | Baxter | G06F 17/3089 709/201 |
| 2007/0294282 A1* | 12/2007 | Cruver | G06F 17/30911 |
| 2008/0229025 A1* | 9/2008 | Plamondon | G06F 12/0862 711/126 |
| 2013/0298109 A1* | 11/2013 | Trinchini | G06F 8/71 717/121 |

OTHER PUBLICATIONS

Li et al., "Challenges and Practices in Deploying Web Acceleration Solutions for Distributed Enterprise Systems", 2004, NEC Laboratories America: Inc., Cupertino, CA, http://dl.acm.org/citation.cfm?id=988712.

(Continued)

*Primary Examiner* — Anthony Mejia
*Assistant Examiner* — Marie Georges Henry
(74) *Attorney, Agent, or Firm* — Haynes and Boone, LLP (57) ABSTRACT

Systems and methods are provided for a caching mechanism that determines validity of cached data using web application business logic. An example system includes a web container that receives a first request to return one or more generated data located in a data cache, and a web application including one or more data validity arbiters and business logic determining the validity of the one or more generated data. The system may further include a business logic caching mechanism that requests the validity of the one or more generated data from the one or more data validity arbiters, wherein the one or more data validity arbiters utilize the business logic to determine the validity of the one or more generated data.

20 Claims, 5 Drawing Sheets

(56) References Cited

OTHER PUBLICATIONS

Chianga et al., "Periodic Cache Replacement Policy for Dynamic Content at Application Server", Mar. 2007, Accenture—Hartford, One Financial Plaza, Hartford, Connecticut; School of Business, University of Connecticut 2100 Hillside Road, Storrs, http://www.sciencedirect.com/science/article/pii/S0167923606001436.

Anton et al., "Web Caching for Database Applications with Oracle Web Cache", 2002, Oracle Corporation, CA, http://dl.acm.org/citation.cfm?id=564762.

Cao et al., "Evaluation of Strong Consistency Web Caching Techniques", 2002, School of Computer Science, University of Waterloo, Waterloo, ON, Canada, http://link.springer.com/article/10.1023/A%3A1019697023170.

* cited by examiner

CACHING MECHANISM FOR DETERMINING VALIDITY OF CACHED DATA USING WEB APPLICATION BUSINESS LOGIC

FIELD OF DISCLOSURE

The present disclosure generally relates to a server system and more particularly to a caching mechanism for an application server that determines validity of cached data using a web application's business logic.

BACKGROUND

In computing, enterprise systems provide application packages to support the computing needs of a business. For example, an enterprise system may provide business processes, including sales, accounting, human resources, data analytics, reporting, and other company operations. Enterprise systems facilitate a business in more easily handling computing needs of the business using a common and interrelated application package. Modern enterprise systems use web applications as access points to the enterprise system instead of localized enterprise applications on individual user workstations. This benefits the user and business by minimizing time and monetary costs of local installation, servicing, and troubleshooting.

Web applications attempt to mimic the comfort and performance of desktop applications. As a result, where desktop applications may make calls to retrieve stored data for one user quickly, web applications that are required to do the same may incur heavy performance penalties from attempting to access large data stores for many people and/or many times. Some web applications often do not retrieve data located in one or more databases at each request for the data. Instead, these web applications use caching mechanisms to increase performance by storing data to more local and/or faster data caches. Current caching mechanisms are time based. However, enterprise applications often work with live data. Thus, time based caching mechanisms do not guarantee the validity of data used by a web based enterprise application.

BRIEF SUMMARY

This disclosure relates to web application systems and method for a caching mechanism for determining validity of cached data using web application business logic. Methods, systems, and techniques for determining the validity of generated data in a data cache using a web application's business logic are provided.

According to an embodiment, a system for determining validity of cached data includes a web container that receives a first request to return one or more generated data located in a data cache and a web application including one or more data validity arbiters and business logic determining the validity of the one or more generated data. The system further includes a business logic caching mechanism that requests the validity of the one or more generated data from the one or more data validity arbiters, wherein the one or more data validity arbiters utilize the business logic to determine the validity of the one or more generated data.

According to another embodiment, a method for determining validity of cached data includes receiving a first request to return one or more generated data located in a data cache. The method further includes requesting, using a hardware processor of an application server, if the one or more generated data is valid from one or more data validity arbiters, wherein the one or more data validity arbiters utilize business logic of a web application to determine the validity of the one or more generated data, and transmitting the one or more generated data to a user if the one or more generated data is valid.

According to another embodiment, a non-transitory computer readable medium comprising a plurality of machine-readable instructions which when executed by one or more processors of a server are adapted to cause the server to perform a method including receiving a first request to return one or more generated data located in a data cache. The method also includes requesting if the one or more generated data is valid from one or more data validity arbiters, wherein the one or more data validity arbiters utilize business logic of a web application to determine the validity of the one or more generated data and transmitting the one or more generated data to a user if the one or more generated data is valid. The method further includes transmitting a second request for one or more updated data if the one or more generated data is invalid, and updating the data cache with the one or more updated data.

BRIEF DESCRIPTION OF THE DRAWINGS

The accompanying drawings, which form a part of the specification, illustrate embodiments of the invention and together with the description, further serve to explain the principles of the embodiments. It should be appreciated that like reference numerals may be used to identify like elements or similarly functioning elements illustrated in one or more of the figures. The drawing in which an element first appears is generally indicated by the left-most digit in the corresponding reference number.

DETAILED DESCRIPTION

It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

Figure 1:
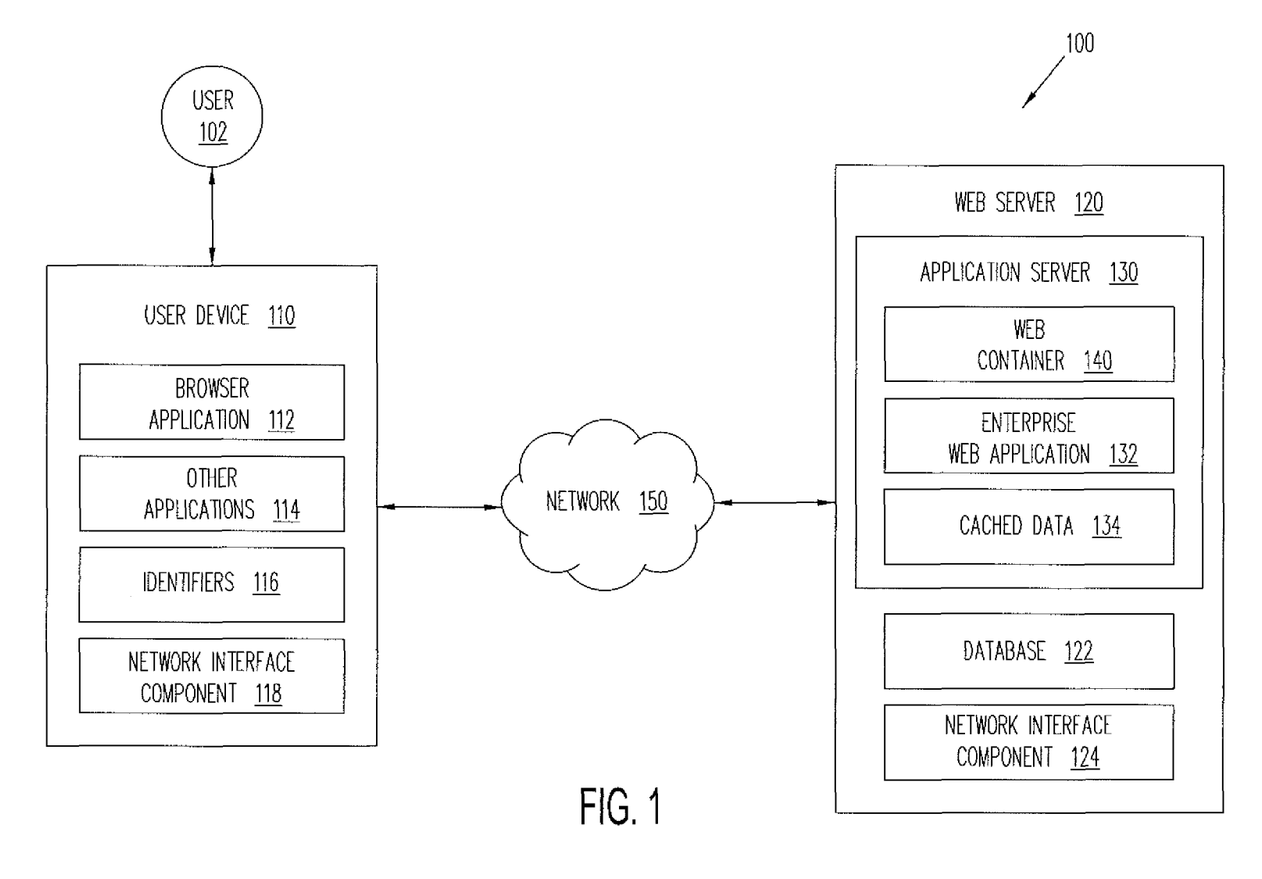
FIG. 1 illustrates an exemplary system for a caching mechanism for determining validity of generated data in a data cache using web application business logic, according to an embodiment.

FIG. 1 illustrates an exemplary system for a caching mechanism for determining validity of generated data in a data cache using web application business logic, according to an embodiment. Terms like "machine," "device," "computer," and "computing system" are used interchangeably and synonymously throughout this document. System 100 may include a server computing system and/or a client computing system.

FIG. 1 is a block diagram of a networked system 100 suitable for implementing the process described herein according to an embodiment. As shown, system 100 may comprise or implement a plurality of devices, servers, and/or software components that operate to perform various methodologies in accordance with the described embodiments. Exemplary device and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user 102, a user device 110, and a web server 120 in communication over a network 150. User 102, such as a data client, may utilize user device 110 to access web server 120 and utilize an enterprise system through enterprise web applications. Thus, user 102 may request or utilize an enterprise web application that accesses cached data. In this regard, a caching mechanism may invoke business logic of the enterprise web application to determine validity of the cached data.

User device 110 and web server 120 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

In FIG. 1, user 102 may interact with a web server 120 through user device 110. For example, user 101 may utilize user device 102 to transmit data queries to a federated database server. User device 110 may be implemented using any appropriate hardware and software configured for wired and/or wireless communication with web server 120. In various embodiments, user device 110 may be implemented as a personal computer (PC), a smart phone, personal digital assistant (PDA), laptop computer, tablet computer and/or other types of computing devices capable of transmitting and/or receiving data. Although a user device is shown, the user device may be managed or controlled by any suitable processing device. Although only one user device is shown, a plurality of user devices may be utilized User 102 may utilize browser application 112 to access web server 120. Browser application 112 may be utilized to provide a web browser interface to transmit requests to web server 120 and receive responses. Browser application 112 may transmit Hyper Text Transfer Protocol (HTTP) requests for processing by web server 120. Requests may correspond to accessing static content, such as files, text, images, or other content (e.g. HTML file, PDF file, JPEG or other image file, ZIP file, or other static content). However, requests may also correspond to a request to access and/or perform a process, for example, a request for a servlet, JavaServer Pages (JSP), or an enterprise application. Thus, browser application 112 may be utilized to provide a convenient interface to user 102 to access and utilize an enterprise web application.

In various embodiments, user device 110 includes other applications 114 as may be desired in particular embodiments to provide features to user device 110. For example, other applications 114 may include security applications for implementing client-side security features, programmatic client applications for interfacing with appropriate application programming interfaces (APIs) over network 150, or other types of applications. Other applications 114 may contain software programs, executable by a processor, including a graphical user interface (GUI) configured to provide an interface to the user.

User device 110 may further include identifiers 116 which may include, for example, identifiers such as operating system registry entries, cookies associated with payment account application 120, browser application 112, and/or other applications 114, identifiers associated with hardware of user device 110, or other appropriate identifiers, such as identifiers used for payment/user/device authentication or identification. Identifiers 116 may be used by a web server 120, to associate user device 110 with a particular account and/or provide session identification.

In various embodiments, user device 110 includes at least one network interface component (NIC) 118 adapted to communicate with network 150 including web server 120. Network interface component 118 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Web server 120 may be maintained, for example, by a business utilizing web applications as access points to an enterprise system. Generally, web server 120 may be maintained by anyone or any entity that provides enterprise web applications for use of an enterprise system. In this regard, web server 120 may include processing applications, which may be configured to interact with browser application 112 of user device 110 to facilitate the use of the enterprise web applications. For example, web server 120 may provide access to an enterprise system, including all processes of an enterprise system (e.g. sales, accounting, human resources, data analytics, reporting, and other business/company operations) through use of one or more enterprise web applications. While utilizing an enterprise web application, user 102 may request, or the enterprise web application may require use of, generated data in a cache. Thus, web server 120 may include and/or utilize a caching mechanism to determine validity of the generated data.

Web server 120 includes an application server 130 having a web container 140, enterprise web application 132, and cached data 134, a database 122, and a network interface component 124. Application server 130, web container 140, and enterprise web application 132 may correspond to processes, procedures, and/or applications executable by a hardware processor, for example, a software program. In other embodiments, web server 120 may include additional or different software as required.

Application server 130 may correspond to a software framework enabling execution of processes, procedures, and/or applications in a web server environment. For example, application server 130 may correspond to an environment to run an application within web server 120. Thus, application server 130 may receive HTTP requests of user 102 from web server 120 when the HTTP requests correspond to the execution of a process, procedure, and/or application. Although application server 130 is shown as residing on web server 120 in FIG. 1, in various embodiments application server 130 may not be local to web server 120. Thus, web server 120 may be in communication with a remote server offering the same or similar operations to application server 130. Additionally, application server 130 may correspond to web server 120 and/or operate as a stand-alone server in communication with user device 110, for example, Tomcat, JBOSS, and Geronimo application servers.

Application server 130 may provide web server 120 capabilities to provide dynamic HTML content through use of applications. Thus, application server 130 may receive an HTTP request for use of an enterprise web application and respond with the results from execution of the enterprise web application. Application server 130 may include business logic of web applications utilized by application server 130.

In order to provide dynamic content to web server 120, application server 130 includes web container 140. Web container 140 may correspond generally to component of application server 130 that interacts and/or manages web modules. Web container 140 may load, unload, and manage processes, procedures, and/or applications, such as servlets, EJB beans, and/or an enterprise web application. Thus, web container 140 provides a run-time environment for web process, procedures, and/or applications. Web container 140 further manages requests for the processes, procedures, and/or applications from application server 130 and responds to requests with application server 130. Web container may correspond to a servlet container and/or a JSP container.

Application server 130 contains enterprise web application 132. Enterprise web application 132 may correspond to a software application executable by a hardware processor and configured to provide computing needs to a business/company. Thus, enterprise web application 132 may correspond to businesses processes, including sales, accounting, human resources, data analytics, reporting, and other business/company operations. Enterprise web application 132 may correspond to purposed-designed software packages corresponding to a specific business. In FIG. 1, enterprise web application 132 resides on web server 120 instead of local to user 102. Thus, enterprise web application 132 uses browser application 112 as an access point for user 102.

Cached data 134 corresponds to data taken from a database, such as database 122, and placed in a cache for use by application server 130. Thus, cached data 134 may correspond to a subset of data from database 122 placed in a memory unit that may be more quickly served to user 102. Cached data 134 may be placed on a block of temporary memory storage. Cached data 134 may be stored, updated, and/or deleted based on business logic of enterprise web application 132.

Database 122 corresponds to a data storage including data stored by a business and used by enterprise web application 132. Database 122 may correspond to a collection of data stored in memory bank that requires additional access time over cached data 134. Thus, database 122 may include information stored in cached data 134. However, database 122 may include additional and/or different information from cached data 134. Database 122 may include sales, accounting, human resources, data analytics, reporting, and other business/company information. In embodiments where user device 110 is in communication with a stand-alone application server, database 122 may reside on the application server. In other embodiments, database 122 may correspond to one or more remote databases.

Web server 120 includes at least one network interface component (NIC) 124 adapted to communicate with network 150 including user device 110. In various embodiments, network interface component 124 may comprise a DSL (e.g., Digital Subscriber Line) modem, a PSTN (Public Switched Telephone Network) modern, an Ethernet device, a broadband device, a satellite device and/or various other types of wired and/or wireless network communication devices including microwave, radio frequency (RF), and infrared (IR) communication devices. In embodiments where user device 110 is in communication with a stand-alone application server, NIC 124 may reside on the application server.

Figure 2:
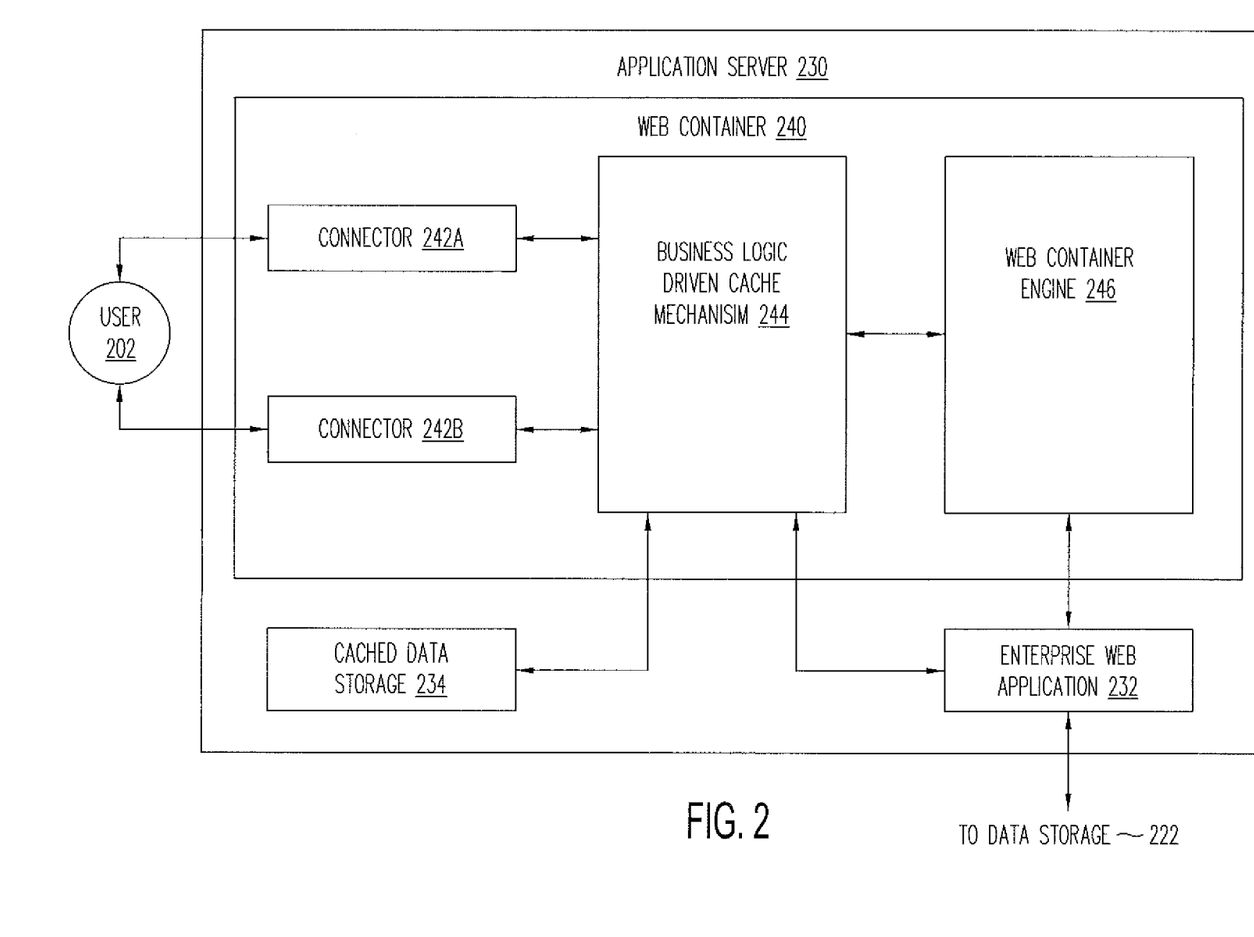
FIG. 2 is a simplified block diagram illustrating an application server with a caching mechanism for determining validity of generated data in a data cache using web application business logic, according to an embodiment.

FIG. 2 is a simplified block diagram illustrating an application server with a caching mechanism for determining validity of generated data in a data cache using web application business logic, according to an embodiment. Although the components of application server 230 are shown residing in one structure, it is understood each structure may be implemented and/or executed by a separate computer system or processor.

Application server 230 is shown in communication with user 202. Application server 230 includes web container 240. Application server 230 and web container 240 may correspond generally to application server 130 and web container 140 of FIG. 1. Thus, application server 230 may correspond to a software framework enabling the execution of web applications. In other embodiments, application server 230 may correspond to both a software framework and the necessary hardware infrastructure to directly process HTTP requests and transmit HTTP responses. In either example, application server 230 includes web container 240 corresponding generally to a component of application server 240 to establish, maintain, and service web modules, including servlets, EJB beans, and/or web applications, such as enterprise web application 232. Web container 240 may correspond to a web container on an Apache Tomcat server, a JBOSS application server, or a JBOSS enterprise application platform. Web container may correspond to a servlet container and/or a JSP container.

Web container of application server 230 may receive requests from user 202, for example through a web server and/or directly, and respond to the requests. The requests may correspond to HTTP requests, and the responses may correspond to HTTP responses displayable within a web browser. As shown in FIG. 2, user requests and responses are transmitted to connector 242A and connector 242B. Connectors 242A and 242B may receive requests and transmit a response to a web server, thus, have a port/IP identification. Additionally, connectors 242A and 242B may correspond to connectors that support HTTP protocol and thus allow application server 230 to function as a stand-alone server.

Requests received by connectors 242A and 242B may correspond to a request to access data in a database corresponding to application server 230. Requests may also correspond to processes of enterprise web application 232 that requires use and/or presentation of data stored in the database. Thus, without using a cache, the request may cause large performance demands and/or significant delays in return of the data.

All or some subset of data in a request from user 202 may be stored in cached data storage 234. Cached data storage 234 may be utilized by application server 230 to serve data more quickly to user 202, thus increasing performance. However, data in cached data storage 234 may be invalid and/or updated information may be required. For example, enterprise web application 232 may require up to date and/or live data, which cannot be cached. Thus, cached data storage 234 may contain inaccurate or incomplete data.

As previously discussed in reference to FIG. 1, enterprise web application 232 may correspond to a web application executing on application server 230 offering enterprise application service to a business/company. In this regard, enterprise web application 232 may include processes to receive, transmit, and/or utilize data of the company. Company data may include sales, accounting, human resources, data analytics, reporting, and other company operation data. Enterprise web application 232 may access company data in a database, such as through to data storage 222. To data storage 222 may correspond to a general connection to a database(s) corresponding to company data. However, enterprise web application 232 may incur large performance deficiencies through attempting to access slower data storage than cached data storage 234 when using company data. To data storage 222, however, may include more recent or "live" data, necessary for use by enterprise web application 232.

Web container engine 246 may correspond to an engine of web container 240 utilized to call, manage, and/or terminate web modules, such as processes including enterprise web application 232. Thus, web container engine 246 may call and execute an instance of enterprise web application 232. Web container engine 246 may receive requests for data from user 202 when data in cached data storage 234 is invalid. Web container engine 246 may process the requests while executing an instance of enterprise web application 232 and respond to user 202.

Business logic driven cache mechanism 244 may correspond to an additional layer in the web container configured to determine whether a request for data received from user 202 is a request for data valid in cached data storage 234. Business logic driven cache mechanism providers a register for data validity arbiters deployed with enterprise web application 232. Thus, business logic driven cache mechanism 244 is in communication with enterprise web application. When user 202 requests data available in cached data storage 234, business logic driven cache mechanism 244 performs a check on a data validity arbiter. The data validity arbiter knows the business logic of enterprise web application 232. The business logic corresponds to business rules determining the validity of data. Thus, the business rules may require certain data to be updated or "live" data used, thus, cached data 234 does not contain valid data. However, in other examples, the business logic may limit data validity to session object (e.g. client identification), type of connector, uniform resource identifier (URI), and/or request parameter.

If generated data in cached data storage 244 is valid based on the business logic of enterprise web application 232, the data validity arbiter will send a yes response, and business logic driven cache mechanism 244 will respond with the requested generated data in cached data storage 234. Thus, only a limited check on the business logic of enterprise web application 232 is required by data validity arbiter. This is optimized for the request because the arbiter is aware of the data model and relationships between data from the business logic of enterprise web application 232.

However, if data requested is not valid in cached data storage 234, then the business logic of enterprise web application 232 is invoked to prepare updated data. Enterprise web application 232 executing in web container engine 246 may obtain data from a data source, such as through to data storage 222. The updated data may correspond to live data or data required to be updated due to the business logic. Business logic driven cache mechanism 244 may increase performance of application server 230 by utilizing a data cache and only requiring updated data from another data source when business logic of enterprise web application 232 requires.

Figure 3:
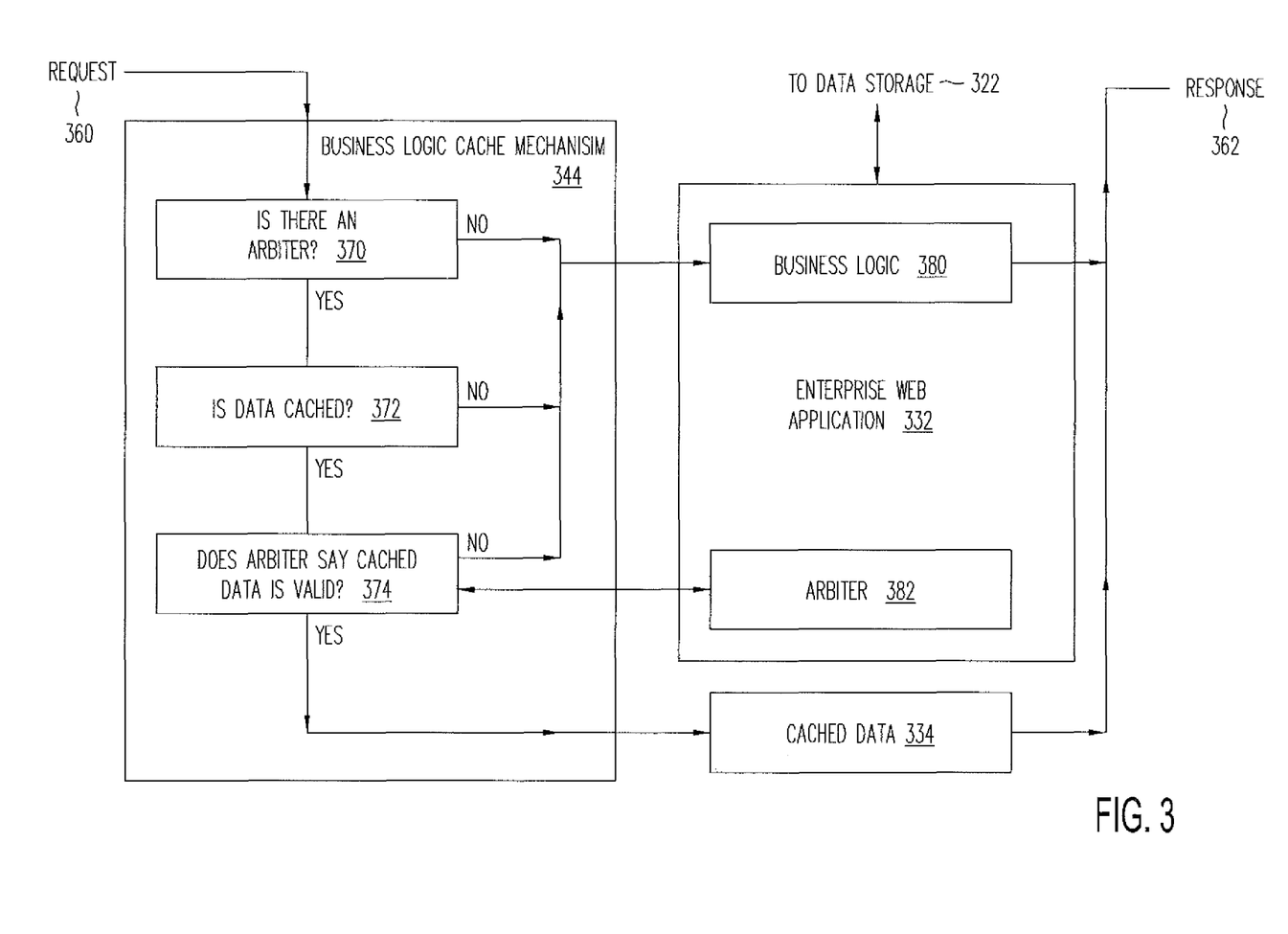
FIG. 3 is a simplified block diagram illustrating an exemplary decision making tree of a caching mechanism determining validity of generated data in a data cache using web application business logic, according to an embodiment.

FIG. 3 is a simplified block diagram illustrating an exemplary decision making tree of a caching mechanism determining validity of generated data in a data cache using web application business logic, according to an embodiment. Note that one or more steps, processes, and methods described herein may be omitted, performed in a different sequence, or combined as desired or appropriate.

Request 360 may be received by business logic cache mechanism 344. As previously discussed, request 360 may be a request from a data client, such as a user, to access data through enterprise web application 332. Enterprise web application 332 may correspond to an executing instance of a web application, for example, on an application server. Data requested may correspond to data available in a cache. Thus, business logic cache mechanism 344 must determine validity of data requested.

At step 370, business logic caching mechanism 344 determines if there is an arbiter. An arbiter, such as arbiter 382, may correspond to a data validity arbiter discussed in FIG. 2, which determines the validity of data in a cache, such as cached data 344. If business logic caching mechanism 344 determines there is no arbiter corresponding the data in request 360, business logic 380 of enterprise web application 332 is invoked, and enterprise web application 332 obtains data through to data storage 322. The data is then communicated to the user through response 362.

However, if an arbiter does correspond to request 360, at step 372 business logic cache mechanism 372 determines if the data is cached. In some embodiments, data in request 360 may not be cached. For example, cached data 334 may be empty during initial execution of enterprise web application 332. In other examples, cached data 334 may not be large enough, may not yet contain, or may have deleted, data in request 360. Thus, if the data does not exist in cached data 334, again business logic 380 of enterprise web application 332 is invoked to obtain the data from another data source and reply with response 362.

If data in request 360 is available in a cache, then at step 374 business logic cache mechanism 344 utilizes arbiter 382 to request if data is valid. Business logic cache mechanism 344 requests validity of generated data in cached data 334 from arbiter 382 of enterprise web application 332. Arbiter 382 is aware of business logic 380 and can therefore determine the validity of data from request 360 in the cache. If arbiter 382 determines the data is not valid, business logic 380 is invoked at data from to data storage 322 is request. Thus, response 362 is prepared and transmitted. In various embodiments, if arbiter 382 determines the data is not valid, enterprise web application 332 may update cached data with the updated data from to data storage 322.

If arbiter 382 determines the data is valid, the business logic cache mechanism 344 may utilize cached data 334 and prepare a response. Since data in request 360 is available in cached data 334, a response may be more quickly transmitted than requiring data from another data storage. Thus, cached data 334 may improve the performance of an application server running enterprise web application 332 by more quickly serving valid data in accordance with business logic 380.

Figure 4:
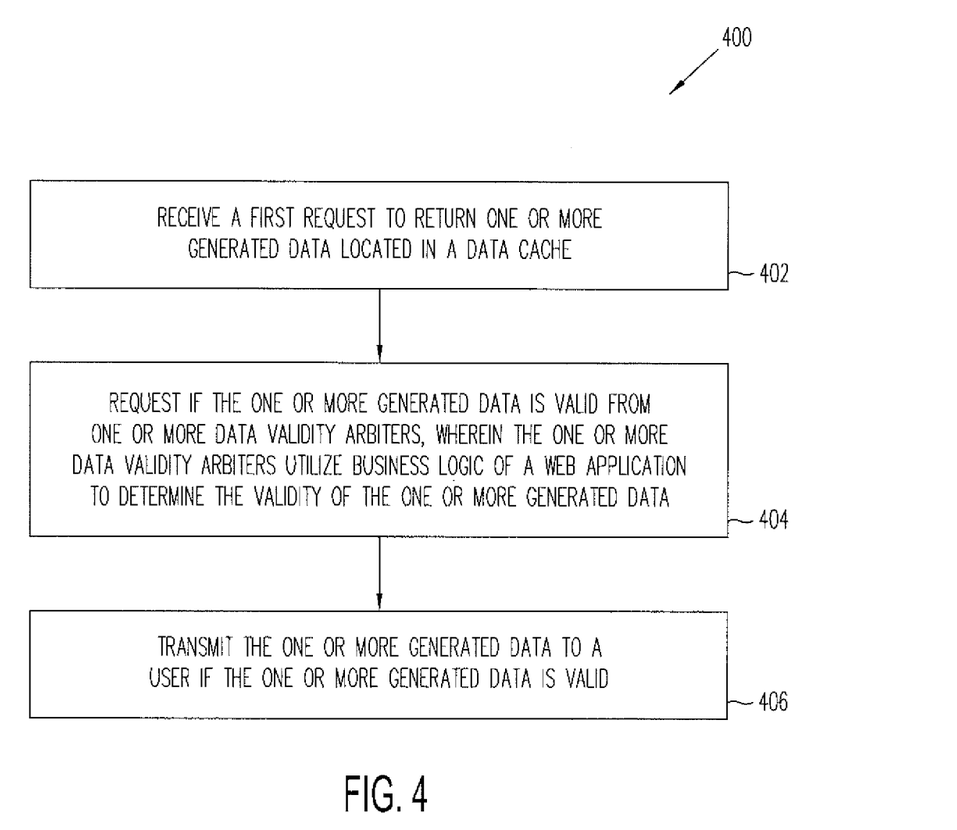
FIG. 4 is a simplified block diagram illustrating an exemplary method of determining validity of generated data in a data cache using web application business logic, according to an embodiment.

FIG. 4 is a simplified block diagram illustrating an exemplary method of a query suggestion using query constraints, according to an embodiment. Note that one or more steps, processes, and methods described herein may be omitted, performed in a different sequence, or combined as desired or appropriate.

At step 402, a first request to return one or more generated data located in a data cache is received, for example, by a web server and/or application server. As previously discussed, a web server may receive HTTP requests and forward them to the correct port/IP of a connection on an application server. However, a stand-alone application server may also directly receive an HTTP request at one or more connectors and process the request.

A request may correspond to a request to return one or more generated data used for an enterprise web application. An enterprise web application may retrieve and process data, potentially storing the generated data in a cache for quicker recall. Thus, while a user utilizes an enterprise web application, the user may request the generated data or may invoke a process that requires the use of the generated data. Where the request is to return and/or utilize data that has not been stored to a cache, the enterprise web application may directly access a data source, such as a database of, or connected to, the web/application server. In various embodiments, the application server may correspond to a JBOSS enterprise application server.

If the generated data exists in a data cache, at step 404 a business logic cache mechanism may request if the one or more generated data is valid from one or more data validity arbiters, where the one or more data validity arbiters utilize business logic of a web application to determine the validity of the one or more generated data. The business logic cache mechanism may execute in a web container as a layer prior to transmitting the request for data to a web container engine executing an instance of a web application. Thus, the web container may correspond to a JSP container. The data validity arbiter may be deployed with an enterprise web application and be aware of the business logic from the enterprise web application. Thus, the data validity arbiter may be able to judge the data model and all relationships between data to determine what data is valid in a data cache.

A data validity arbiter may utilize business logic of the web application to determine the validity of the one or more generated data in a data cache. The business logic may correspond to a session parameter, such as client identification, a connector type, configuration, and/or designation, a uniform resource identifier (URI), and/or a request parameter. The request parameter may include parameters set by a user requesting the data. Additionally, in various embodiments, the data validity arbiter may further use time stamps to determine the validity of cached data.

If the data validity arbiter determines the one or more generated data is invalid based on the business logic, the web application may request one or more updated data to replace the one or more generated data. The web application may transmit the one or more updated data to the user and/or utilize the one or more updated data during execution of the web application. Additionally, the web application may store the updated data in the data cache for future use.

If the one or more generated data in the data cache is determined to be valid by the data validity arbiter, the one or more generated data may be transmitted to the user at step 406. The user may therefore be served data more quickly from a data cache while ensuring that the data from the data cache is valid according to the business logic of a web application. Performance of a web application executing on an application server may be increased over calls to disparate databases to retrieve data.

Figure 5:
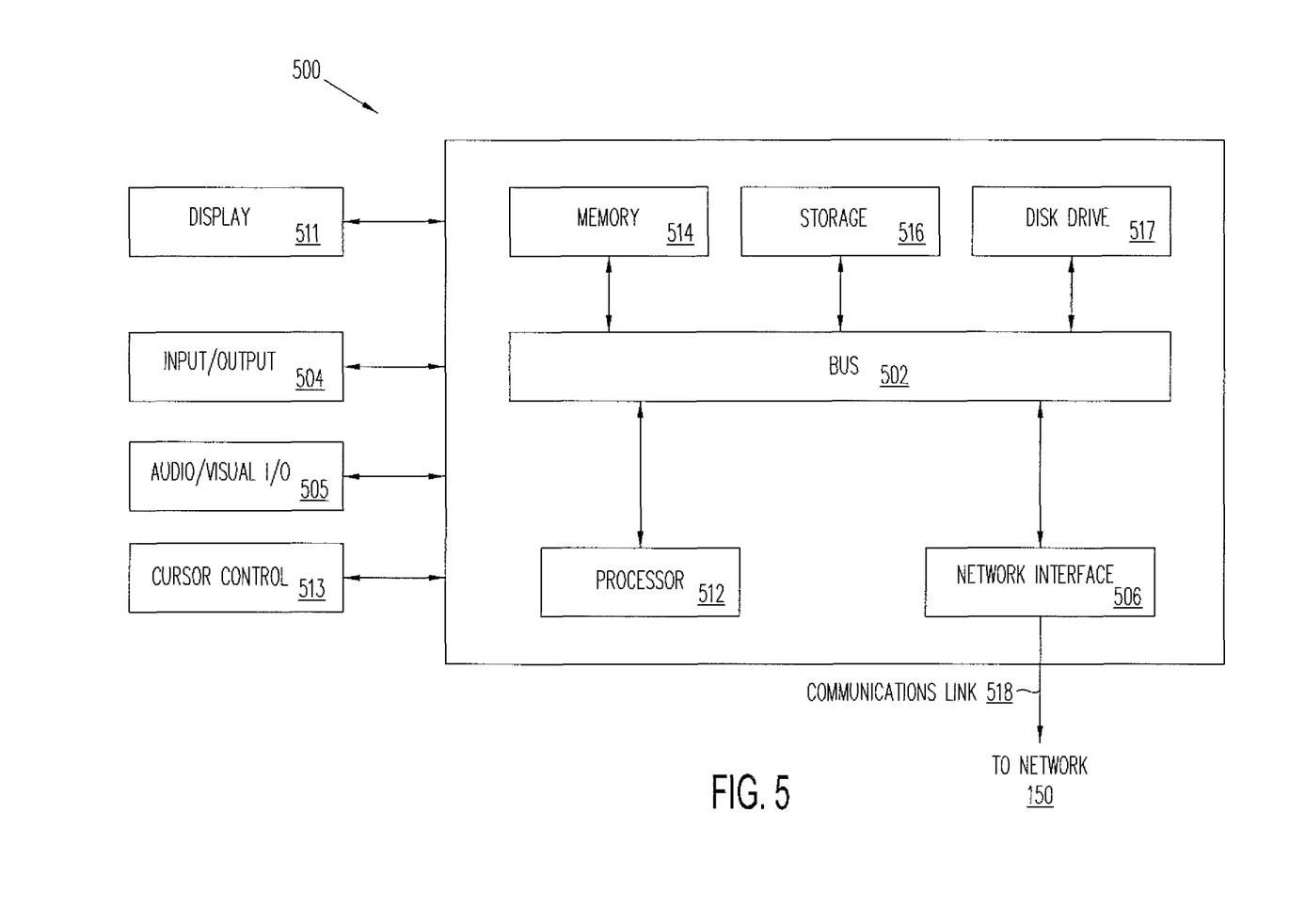
FIG. 5 is a block diagram of a computer system suitable for implementing one or more embodiments of the present disclosure.

FIG. 5 is a block diagram of a computer system 500 suitable for implementing one or more embodiments of the present disclosure. In various embodiments, the endpoint may comprise a personal computing device (e.g., smart phone, a computing tablet, a personal computer, laptop, PDA, Bluetooth device, key FOB, badge, etc.) capable of communicating with the network. The merchant server and/or service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another endpoint, a merchant server, or a service provider server via network 150.

Network 150 corresponds to network 150 of FIG. 1 and may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by computer system 500 and the various components of system 100 of FIG. 1.

In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A system of determining validity of cached data, the system comprising:
a web server comprising one or more hardware processors configured to execute:
a web container configured to:
receive a first request to return one or more generated data by an enterprise web application located in a data cache, wherein the one or more generated data is dynamic or static based on business logic of the enterprise web application, and wherein the enterprise web application is associated with one or more data validity arbiters that determine the validity of the one or more generated data using the business logic of the enterprise web application; and
a business logic driven caching layer of the web container configured to:
determine that a data validity arbiter corresponds to the business logic associated with the one or more generated data;
determine that the one or more generated data is in the data cache;
determine, using the data validity arbiter, a relationship between the business logic and the one or more generated data;
perform a limited check of the validity of the one or more generated data using the data validity arbiter corresponding to the subset of the business logic associated with the one or more generated data, wherein the data validity arbiter utilizes the business logic to determine the validity of the one or more generated data, and wherein the limited check is optimized to check the validity of only the one or more generated data based on the relationship;
in response to the one or more data validity arbiters determining that a dynamic portion of the one or more generated data requires updated data based on the business logic, receiving the updated data for the dynamic portion of the one or more generated data;
retrieve, from the data cache, static data for a static portion of the one or more generated data based on the business logic; and
prepare a response to the first request, wherein the response comprises the updated data with the static data from the data cache.

2. The system of claim 1, wherein the one or more data validity arbiters further utilize time stamps to determine the validity of the one or more generated data.

3. The system of claim 2, wherein the web server further comprises:
the data cache including the one or more generated data, wherein the web container accesses the data cache and transmits the static data for the static portion of the one or more generated data to a user.

4. The system of claim 2, wherein the business logic driven caching layer receives the updated data for the dynamic portion of the one or more generated data in response to a second request by the business logic driven caching layer for the updated data from the enterprise web application.

5. The system of claim 4, wherein the web container further includes a web container engine, and wherein the web container engine transmits the second request for the one or more updated data to the enterprise web application.

6. The system of claim 5, wherein the web container updates the data cache with the one or more updated data.

7. The system of claim 2, wherein the business logic includes client identification, a connector, a uniform resource identifier (URI), or a request parameter.

8. The system of claim 1, wherein the web server corresponds to an enterprise application server comprising the enterprise web application.

9. The system of claim 1, wherein the web container is a JavaServer Pages (JSP) container.

10. A method for determining validity of cached data, the method comprising:
- receiving a first request to return one or more generated data by an enterprise web application located in a data cache, wherein the one or more generated data is dynamic or static based on business logic of the enterprise web application;
- determining, using a hardware processor of an application server, that a data validity arbiter of one or more data validity arbiters that determine whether the one or more generated data is valid using the business logic associated with the one or more generated data;
- determining using a hardware processor of an application server, that the one or more generated data is in the data cache;
- determining, using the data validity arbiter, a relationship between the business logic and the one or more generated data;
- performing, using a hardware processor of an application server, a limited check if the one or more generated data is valid using the data validity arbiter of the one or more data validity arbiters, wherein the one or more data validity arbiters utilize the business logic to determine the validity of the one or more generated data, and wherein the limited check is optimized to check if only the one or more generated data is valid based on the relationship;
- in response to the data validity arbiter determining that a dynamic portion of the one or more generated data requires updated data based on the business logic, receiving the updated data for the dynamic portion of the one or more generated data;
- retrieving, from the data cache, static data for a static portion of the one or more generated data based on the business logic; and
- preparing a response to the first request, wherein the response comprises the updated data with the static data from the data cache.

11. The method of claim 10, wherein the one or more data validity arbiters further utilize time stamps to determine the validity of the one or more generated data.

12. The method of claim 11, wherein the business logic includes at least one of client identification, a connector, a uniform resource identifier (URI), or a request parameter.

13. The method of claim 10, wherein prior to the receiving the updated data for the dynamic portion, the method further comprises:
- transmitting a second request for the updated data.

14. The method of claim 13, wherein the second request is transmitted to the enterprise web application.

15. The method of claim 14 further comprising:
- updating the data cache with the one or more updated data.

16. The method of claim 10, wherein the application server is an enterprise application server including the enterprise web application.

17. A non-transitory computer readable medium comprising a plurality of machine-readable instructions which when executed by one or more processors of an application server are adapted to cause the application server to perform a method comprising:
- receiving a first request to return one or more generated data by an enterprise web application located in a data cache, wherein the one or more generated data is dynamic or static based on business logic of the enterprise web application;
- determining, using a hardware processor of an application server, that a data validity arbiter of one or more data validity arbiters that determine whether the one or more generated data is valid using the business logic associated with the one or more generated data;
- determining using a hardware processor of an application server, that the one or more generated data is in the data cache;
- determining, using the data validity arbiter, a relationship between the business logic and the one or more generated data;
- performing a limited check if the one or more generated data is valid using the data validity arbiter of the one or more data validity arbiters, wherein the one or more data validity arbiters utilize the business logic of to determine the validity of the one or more generated data, and wherein the limited check is optimized to check if only the one or more generated data is valid based on the relationship;
- in response to the data validity arbiter determining that a dynamic portion of the one or more generated data requires updated data based on the business logic, receiving the updated data for the dynamic portion of the one or more generated data;
- retrieving, from the data cache, static data for a static portion of the one or more generated data based on the business logic; and
- preparing a response to the first request, wherein the response comprises the updated data with the static data from the data cache.

18. The non-transitory computer readable medium of claim 17, wherein the one or more data validity arbiters further utilize time stamps to determine the validity of the one or more generated data.

19. The non-transitory computer readable medium of claim 17, wherein the business logic includes at least one of client identification, a connector, a uniform resource identifier (URI), or a request parameter.

20. The non-transitory computer readable medium of claim 17, wherein the application server is an enterprise application server including the enterprise web application.

* * * * *